July 15, 1952 M. CAMRAS 2,603,721

MAGNETIC RECORDER WITH PRESSURE SHOE FOR RECORD MEMBERS

Filed Dec. 8, 1947

Inventor
MARVIN CAMRAS by The Firm of Charles W. Hills Attys.

Patented July 15, 1952 2,603,721

UNITED STATES PATENT OFFICE 2,603,721

MAGNETIC RECORDER WITH PRESSURE SHOE FOR RECORD MEMBERS

Marvin Camras, Chicago, Ill., assignor to Armour Research Foundation of Illinois Institute of Technology, Chicago, Ill., a corporation of Illinois Application December 8, 1947, Serial No. 790,418

2 Claims. (Cl. 179—100.2)

This invention relates to a magnetic recorder and more particularly to a magnetic recorder having a pressure shoe for the magnetic record member.

In one method of magnetic recording a lengthy magnetizable record medium is drawn across an electromagnetic transducer head assembly at substantially uniform linear velocity. The head assembly includes a magnetic core member having a non-magnetic cap over which the medium passes, and which is provided with suitable current conducting exciting elements to produce a magnetic field across the gap.

During the recording operation current is caused to flow in exciting elements in accordance with time variations of an intelligence to produce a time varying magnetic field in the core in accordance with the value thereof. The lengthy magnetizable medium is subjected to the influence of this field as it is drawn therethrough and magnetization is imparted to incremental lengths of the medium in accordance with the time variations of the intelligence, thus causing variations in the magnetization of the medium along its length in accordance with the time variations of the intelligence.

During reproduction, the lengthy magnetizable medium is drawn across the same or a similar head assembly to set up a flux in the core portion thereof in accordance with the magnetization of the medium along successive incremental lengths thereof as it passes across the gap of the magnetic core member. The resultant time varying flux induces voltage in the coil with which the flux is linked in accordance with the time rate of change thereof. This voltage may be amplified and suitably reproduced by a loudspeaker or similar device to produce the intelligence recorded.

This magnetic recording and reproducing inherently involves the conversion of an intelligence to a time varying magnetic field during the recording operation and the conversion of a time varying magnetic flux to an intelligence in the reproducing operation. It will therefore be apparent to those skilled in the art that it is extremely important that the lengthy medium or magnetic record member shall always be positioned at exactly the same place with respect to the electromagnetic transducer head each time that the record member is passed over the head.

It has been found to be particularly important to use some means for closely confining the record member to the head when the record member is in the form of a paper tape having a magnetic track thereon or in the form of a plastic film having a magnetic track thereon.

This invention is an improvement in the invention disclosed in my prior United States Letters Patent No. 2,351,007 for "Magnetic Recording Head," granted June 13, 1944.

One of the principal features and objects of the present invention is to provide a novel pressure shoe structure which will conform to irregularities in the head or in the record member itself so that the record member, such, for example, as a paper tape record member, will be caused to closely hug the electromagnetic transducer head as it passes thereacross.

A further object of the present invention is to provide a novel method and means for constantly maintaining a lengthy magnetic record member in continual close abutting contact with the pole of an electromagnetic transducer head irrespective of irregularities in the surface of the pole or in the record member itself.

Another and further object of the present invention is to provide a pressure shoe for magnetic recorders of novel construction.

Other objects and features which I believe to be characteristic of my invention are set forth with particularity in the appended claims. My invention itself, however, both as to its organization, manner of construction and method of operation, together with further objects and advantages thereof may best be understood by reference to the following description taken in connection with the accompanying drawing, in which:

Figures 1, 2, 3, 4, 5, 6:
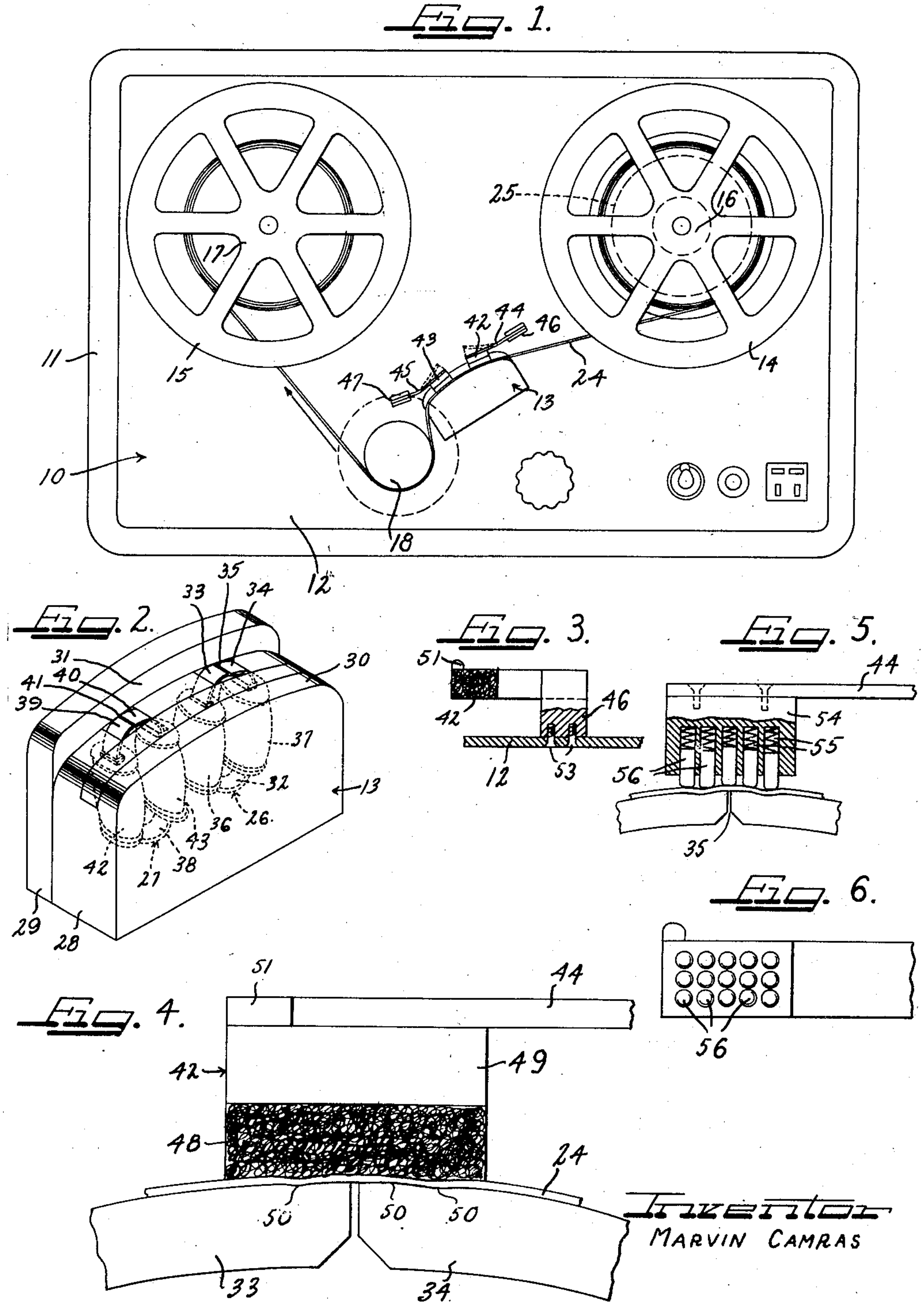
Figure 1 is a plan view of a magnetic recorder embodying the novel teachings and principles of the present invention.
Figure 2 is an isometric view of an electromagnetic transducer head and erase head assembly as used on the magnetic recorder illustrated in Figure 1.
Figure 3 is a fragmentary elevational view partly in section of one of the pressure shoes shown in Figure 1.
Figure 4 is a greatly enlarged fragmentary horizontal sectional view through the right-hand pressure shoe of Figure 1 and a portion of the pole pieces of the erase head.
Figure 5 is a horizontal fragmentary sectional view similar to Figure 4 (but on a somewhat reduced scale) illustrating a modified form of pressure shoe.
Figure 6 is an elevational view of the pressure shoe shown in Figure 5.

As the term "magnetic recorder" is used herein, it refers either to magnetic recording apparatus, magnetic reproducing apparatus or apparatus for both magnetic recording and magnetic reproducing. Furthermore, as the term "electromagnetic transducer head" is used herein, it refers to a head for converting a time varying electric current into a time varying magnetic field through which a magnetizable record member is passed, or to a head for converting a time varying magnetic field to a time varying electric current, or to an erase head in which an alternating current is converted into an alternating magnetic field which demagnetizes the magnetic record member.

The novel pressure shoes of the present invention may, of course, be employed on a wide variety of magnetic recorders without departing from the spirit and scope of the present invention. They have been shown in Figure 1 of the drawings as being mounted on a magnetic recorder of the dual channel one-way drive type. This recorder, generally designated as 10, includes a housing 11 which houses the drive mechanism and amplifying equipment (not shown). The housing 11 is closed off at the top by top panel 12 on which an electromagnetic transducer head assembly 13, the supply reel 14 and take-up reel 15 are mounted. The reels 14 and 15 are mounted on spindles 16 and 17, respectively. Also mounted on the panel 12 is a capstan drive roller 18 which is arranged to be driven at a uniform angular velocity from a motor drive shaft 19 through drive rollers 20 and 21, the latter being mounted and secured to the capstan shaft 22.

The take-up reel 15 is driven through a belt drive 23 from the motor drive shaft 19. Though this drive mechanism a magnetic record member 24 such, for example, as a paper tape having a coating of magnetizable material thereon is transferred from this supply reel 14 to the take-up reel 15. The magnetic record member 24, in travelling from the supply reel 14 to the take-up reel 15, crosses the electromagnetic transducer head assembly 13 and then over the capstan drive roll 18. The drive connection between the motor drive shaft 19 and the take-up reel 15 is arranged to slip as is necessary in constant drive types of magnetic recorders since the take-up reel must be driven at a speed which tends to try to take up the magnetic record member faster than the capstan causes it to travel.

The supply reel 14 preferably is provided with a friction brake disk 25 which maintains the magnetic record member 24 taut over the head assembly 13.

The head assembly 13 may be understood best from an inspection of Figure 2 of the drawing. This electromagnetic transducer head assembly 13 includes an erase head 26 and a record play-back head 27 which are mounted in a plastic housing 28 having a back wall portion 29 which extends somewhat beyond the curved surface 30 of the housing 28 to provide a flange portion 31 against which the edge of the record member 24 is seated as it passes over the electromagnetic transducer head assembly 13. The erase head 26 includes a core portion 32 having a pair of confronting polar portions 33 and 34. The pole portions 33 and 34 are slightly spaced to form a non-magnetic gap 35. A pair of coils 36 and 37 are mounted on the core 32 and are electrically connected and wound to be in aiding relation to each other in setting up a magnetic flux in the core 32. The record play-back head 27 is similarly constructed and includes a core 38 having confronting pole portions 39 and 40 with a non-magnetic gap 41 between the ends of the latter. Signal coils 42 and 43 are mounted on the core 38 in a similar manner to the coils 36 and 37 of the erase head 26. As is the usual practice, the non-magnetic gap 41 in the record play back head 27 is substantially smaller than the erase gap 35 in the erase head 26.

As shown, the pole portions 33 and 34 of the erase head 26 and the pole portions 39 and 40 of the record play-back head 27 cover slightly less than one-half of the width of the tape record member 24. The tape record member is thus arranged to have two records thereon lying side by side, one extending in one direction and the other extending in the opposite direction. Thus after the record member has been transferred from the supply reel 14 to the take up reel 15, the two reels may be interchanged and turned upside down, thus placing the other half of the record member in operative engagement with the poles 33 and 34 and the poles 39 and 40. In this second operation, the reel 14 which was originally the supply reel now becomes the take-up reel, and the reel 15 which was originally the take-up reel is now the supply reel. After the record has been played so as to reproduce the other half of the width of the record, the record is in its original condition. This eliminates the necessity of rewinding.

In the embodiment of the present invention illustrated in Figure 1, two pressure shoes 42 and 43 are provided for holding the magnetic tape record member 24 against the heads 26 and 27 of the electromagnetic transducer head assembly 13. These heads 42 and 43 are mounted on leaf springs 44 and 45 which, in turn, are secured in mounting posts 46 and 47, respectively. The two pressure shoes are similar in construction so, for purposes of simplicity, only one of the shoes, namely 42, is illustrated in detail in Figures 3 and 4 of the drawing. As shown in Figures 3 and 4, the pressure shoe 42 includes a felt pad 48 secured to a block 49 carried on the leaf spring 44. The characteristic springiness of the fibers of a piece of wool felt is here utilized to cause the record member 24 to follow the possible irregularities 50 in the surface of the poles 33 and 34 of the head 26. This will also cause the record member 24 to remain in close contact with the poles, even where there is an irregularity in the surface of the tape. In effect, the felt pad 48 which is spring pressed against the tape 24 by the leaf spring 44 presents a multitude of individual pressure points over a substantial area, each of which tends to press the portion of the tape lying immediately thereunder into close contact with the head.

In order to make it easy to slip the tape 24 between the pressure shoe 42 and the head, an ear 51 is provided at the end of the leaf spring 44 which may be conveniently grasped so as to retract the pressure shoe 42 to its dotted line position as shown in Figure 1 of the drawing. A similar ear 52 is also placed on the leaf spring 45.

The post 46 may be conveniently secured to the panel 12 by bolts 53. The post 47 may be similarly secured to the panel 12.

In Figures 5 and 6, a modified form of the present invention is shown wherein the pressure shoes include a block 54 which is secured to the end of the leaf spring 44. The block 54 is provided with a plurality of wells or recesses 55 in which are disposed plungers or fingers 56 which are spring-pressed outwardly by suitable springs 57. Any suitable means (not shown) may be provided for limiting the outward movement of the fingers 56 so that they will not fly out of the block 54 when the pressure shoe is flexed back away from the head against which the shoe presses the magnetic tape 24.

The fingers present a large number of relatively small pressure points constantly urging the magnetic record member 24 against the poles of the head structure. These small pressure points define a face in engagement with the magnetic record member 24. These individually acting pressure points thus cause all of the tape to be retained in close contact with the poles of the head structure as the record member passes thereover. It has been found in practice that this is greatly superior to a single pressure shoe of rigid material which is resiliently urged against the record member.

In such a construction as illustrated in Figures 5 and 6 of the drawing, it is preferable that one transverse row of pressure fingers be located directly over the gap 35 of the head 26. A similar shoe is, of course, provided over the record playback head. It is further desirable that the ends of the fingers 56 be rounded so as not to damage the tape record member 24 as it passes thereunder.

It will be apparent to those skilled in the art that the upstanding posts 46 and 47 may be constructed for manual rotation when it is desired to retract the pressure shoes out of engagement with the medium. Moreover, rotation of these posts permits adjustment of the spring pressure on the shoes and hence the total force exerted on the pressure pads.

While I have shown certain particular embodiments of my invention, it will, of course, be understood that I do not wish to be limited thereto since many modifications may be made, and I therefore contemplate by the appended claims to cover all such modifications as fall within the true spirit and scope of my invention.

I claim as my invention:

1. An electromagnetic transducer head assembly comprising a core having a pair of confronting pole pieces and a non-magnetic gap between their extremities, said confronting pole pieces each having a surface portion over which a magnetic record member is arranged to successively pass, a shoe mounted opposite said pole pieces and having a record member-engaging portion positioned to engage a record member over both of said pole pieces and over said gap, said record member-engaging portion being formed of soft springy material, and means for urging said shoe toward said pole pieces and said non-magnetic gap, whereby said soft springy material of said shoe resiliently and positively presses a record member against said core over both of said pole pieces and said gap.

2. An electromagnetic transducer head assembly comprising a core having a pair of confronting pole pieces and a non-magnetic gap between their extremities, said confronting pole pieces each having a surface portion over which a magnetic record member is arranged to successively pass, a shoe mounted opposite said pole pieces and having a record member-engaging portion positioned to engage a record member over both of said pole pieces and over said gap, said shoe inculding a felt-like pad forming a record member contact area, and means for urging said shoe toward said pole pieces and said non-magnetic gap, whereby said felt-like pad positively presses a record member against said core over both of said pole pieces and said gap.

MARVIN CAMRAS.

REFERENCES CITED

The following references are of record in the file of this patent:

UNITED STATES PATENTS

| Number | Name | Date |
|---|---|---|
| 739,134 | Anderson | Sept. 15, 1903 |
| 2,306,162 | Gipe | Dec. 22, 1942 |
| 2,351,007 | Camras | June 13, 1944 |

FOREIGN PATENTS

| Number | Country | Date |
|---|---|---|
| 172,296 | Great Britain | Feb. 26, 1923 |
| 280,800 | Germany | Nov. 30, 1914 |